(No Model.)
J. H. VINTON.
ANTIFRICTION HUB OR WHEEL BEARING.
No. 586,535. Patented July 13, 1897.
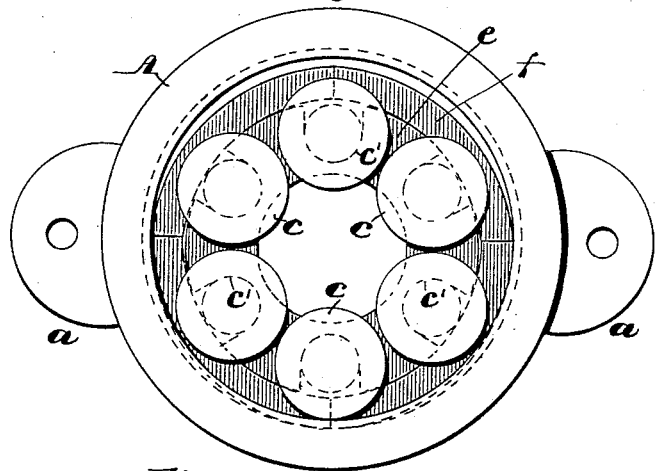
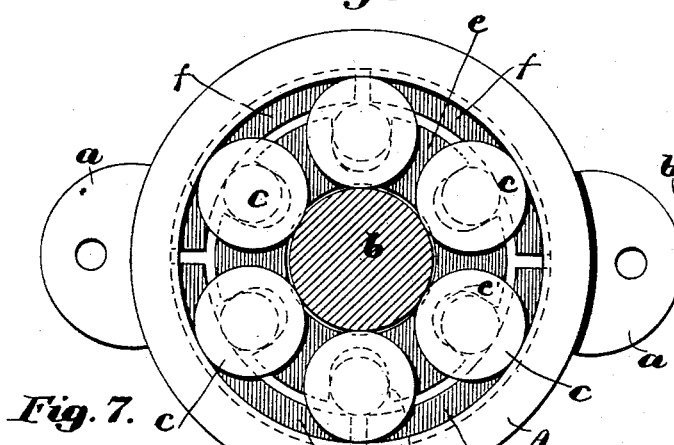
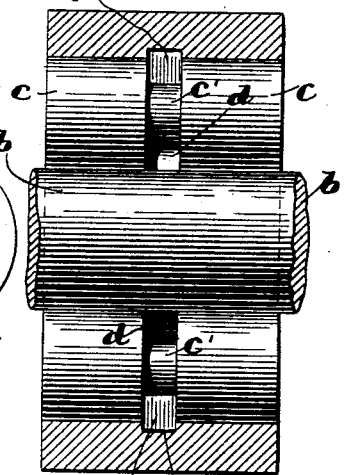
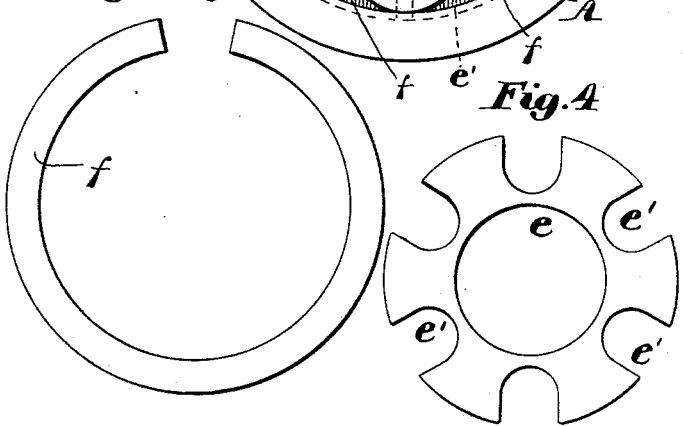
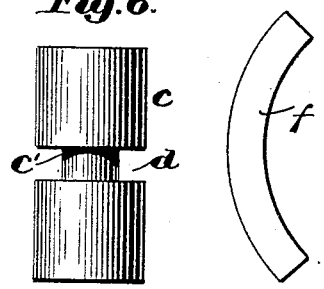
Witnesses:
Walter C. Lombard
Edward F. Allen
Inventor:
John H. Vinton,
by Crosby & Gregory
Attys.

UNITED STATES PATENT OFFICE.

JOHN H. VINTON, OF BOSTON, MASSACHUSETTS, ASSIGNOR OF TWO-THIRDS TO EDWARD O. ELY, OF SAME PLACE.

ANTIFRICTION HUB OR WHEEL BEARING.

SPECIFICATION forming part of Letters Patent No. 586,535, dated July 13, 1897.

Application filed May 17, 1897. Serial No. 636,880. (No model.)

*To all whom it may concern:*

Be it known that I, JOHN H. VINTON, of Boston, county of Suffolk, State of Massachusetts, have invented an Improvement in Antifriction Hub or Wheel Bearings, of which the following description, in connection with the accompanying drawings, is a specification, like letters on the drawings representing like parts.

This invention has for its object the production of an antifriction hub or wheel bearing adapted for use in connection with wheels, such, for instance, as employed in pulley-blocks, trolley-wheels, &c.

In my invention I employ a circular case or box made as a solid ring, provided substantially midway its ends with an annular groove, and inside this box I place a series of roller-bearings, each having an annular groove to leave journals for the said roll, said journals being fitted into open notches of a bearing-ring, an open or expansible ring being located between the said bearing-ring and the interior of the said solid ring and adapted to enter not only the annular grooves in the rolls, but also the annular grooves at the interior of the solid case or ring.

Figure 1, in side elevation, shows a hub-bearing embodying my invention, but with the shaft, stud, or axle about which it turns omitted. Fig. 2 is a like view with the shaft, stud, or axle in place. Fig. 3 is a section through the ring in the line $x$, Fig. 2. Fig. 4 shows the inner bearing-ring. Fig. 5 shows part of an expansible ring made in sections. Fig. 6 shows one of the rollers detached, and Fig. 7 shows a one-piece expansible ring.

The circular case or box A is shown as a solid or unbroken ring provided, it may be, with ears $a$, by which to secure the case or box at the sides of a pulley-block, but instead of these ears the exterior of the case may be shaped in any other usual manner to enable the case to be secured within the wheel or device to be provided with a central hub or bearing, and in practice my invention to be described will act just alike whether the case be stationary and the shaft, stud, or axle be revolved on the rolls $b$, or whether the shaft, stud, or axle $b$ should be stationary and the hub, the case, and its rolls rotate about it, as would happen, say, if the bearing-hub is in a pulley-block or in a trolley-wheel.

Heretofore great trouble has been experienced in retaining these rolls within the case or shell, so that they could be used for any length of time, and among other plans which have been devised the case or ring has been cut in halves and the ends of the segments have been provided with a tongue and groove to fit one into the other, and each half of the segment has been provided at its interior with a rib which, when the two halves of the case or ring were put together, would enter the annular groove of the rolls, the said ribs and the edges of the bearing-rings $e$, notched at $e'$ for the reception of the journal $c'$ of the rolls $c$, serving to keep the rolls in the said case. The rolls $c$ and the bearing-ring $e$ are old and common.

I find in practice that the divided case does not possess sufficient solidity, and, further, it is very expensive to make, as the segments have to be bored from opposite sides in two operations, and the tongue and groove have to be fitted very exactly.

In accordance with my invention I take a casting of the proper shape exteriorly and I bore the same uniformly from one to its other side and then, with a proper tool, I cut an annular groove $a'$ within the inner wall of the case or ring so made. I then provide for locking the rolls. They being placed in the notches $e'$ of the bearing-ring $e$, I provide an expansible ring, which may be variously constructed—*i. e.*, it may be made in one or more pieces. For instance, the ring may have an external diameter substantially equal to the distance across the ring in the bottom of the groove $a'$, and said ring may have a portion of it cut away, as shown in Fig. 7, or it may be cut up into segments, one of said segments being shown in Fig. 5, and when putting the rolls and the bearing-ring into the shell or case this expansibe ring is contracted, so that its inner edge enters the grooves of the rollers, the outer edges of the ring being contracted into such a space that the said expansible ring may enter the open end of the solid case or ring, and when the rolls are forced sufficiently far into the solid ring or case, so that the periphery of the expansible ring comes opposite the groove $a'$, then said expansible ring partially enters said groove $a'$, and, lying therein, the annular groove of the rolls retains the rollers, together with the bearing-ring, in operative position. This expansible ring may, if desired, be made with an external diameter substantially equal to the inner diameter of the case or ring, and when the said ring is cut into segments it may be expanded outwardly; or I may, if desired, use a ring composed of spring-wire, shaped substantially as in Fig. 7, so that it may be contracted to enter the open end of the solid case or ring and thereafter expand, said ring entering both the annular groove $a'$ and the grooves of the rolls. Whenever this expansible ring, of whatever form, is made to engage the grooves in the rolls and the annular groove in the solid case or ring, the said expansible ring will act to lock and hold the rolls in position.

Believing myself to be the first to use an expansible ring in the manner herein described, this invention is not limited to the particular shape or construction of the ring, so long as it has the capacity of being contracted to enter with the rolls into the interior of the case, and may thereafter be expanded, so that the said expansible ring may partially enter the groove $a'$ at the interior of the said case.

Having described my invention, what I claim as new, and desire to secure by Letters Patent, is—

1. A hub-bearing, composed of a solid case or ring-like shell, provided at its interior with an annular groove, a nest of rolls, a bearing-ring notched exteriorly to receive the journals of said rolls, and an expansible loose ring adapted to enter both the annular grooves of the rolls and the groove at the inner side of the said solid case or ring-like shell, substantially as described.

2. A hub-bearing, composed of a solid case or ring-like shell, provided at its interior with an annular groove, a nest of rolls, a bearing-ring notched exteriorly to receive the journals of said rolls, and an expansible loose ring presenting segments and adapted to enter both the annular grooves of the rolls and the groove at the inner side of the said solid case or ring-like shell, substantially as described.

In testimony whereof I have signed my name to this specification in the presence of two subscribing witnesses.

JOHN H. VINTON.

Witnesses:
GEO. W. GREGORY,
MARGARET A. DUNN.